US006810648B2

(12) United States Patent
McClain

(10) Patent No.: US 6,810,648 B2
(45) Date of Patent: Nov. 2, 2004

(54) LAWN MOWER DECK VERTICAL MOVEMENT LIMITER

(75) Inventor: Michael R. McClain, Fort Mill, SC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/934,860

(22) Filed: Aug. 22, 2001

(65) Prior Publication Data

US 2003/0037526 A1 Feb. 27, 2003

(51) Int. Cl.$^7$ .............................................. A01D 34/64
(52) U.S. Cl. ........................ 56/15.9; 56/17.1; 56/208
(58) Field of Search ................................ 56/15.9, 17.1, 56/208

(56) References Cited

U.S. PATENT DOCUMENTS

| 2,862,343 A | * | 12/1958 | Wood .......................... 56/15.3 |
| 4,310,997 A | * | 1/1982 | Streicher ...................... 56/15.9 |
| 5,025,617 A | * | 6/1991 | Kuhn et al. ................... 56/15.6 |
| 5,163,274 A | * | 11/1992 | Burdsall et al. .............. 56/14.9 |
| 5,238,267 A | * | 8/1993 | Hutchison et al. .......... 280/781 |
| 5,410,865 A | * | 5/1995 | Kurohara et al. ............. 56/15.9 |
| 5,937,625 A | * | 8/1999 | Seegert ........................ 56/15.6 |

* cited by examiner

*Primary Examiner*—Thomas B. Will
*Assistant Examiner*—Alicia Torres
(74) *Attorney, Agent, or Firm*—Harrington & Smith, LLP

(57) ABSTRACT

A lawn mower having a frame, a motor connected to the frame, a driver's seat located on the frame, a cutting blade connected to the motor, a deck located above the cutting blade and vertically movably mounted to the frame, and a draft rod connected between the deck and a portion of the frame. The draft rod is movably connected between the deck and the portion of the frame to limit upward vertical movement of the deck relative to the frame to a predetermined upper stop location.

19 Claims, 2 Drawing Sheets

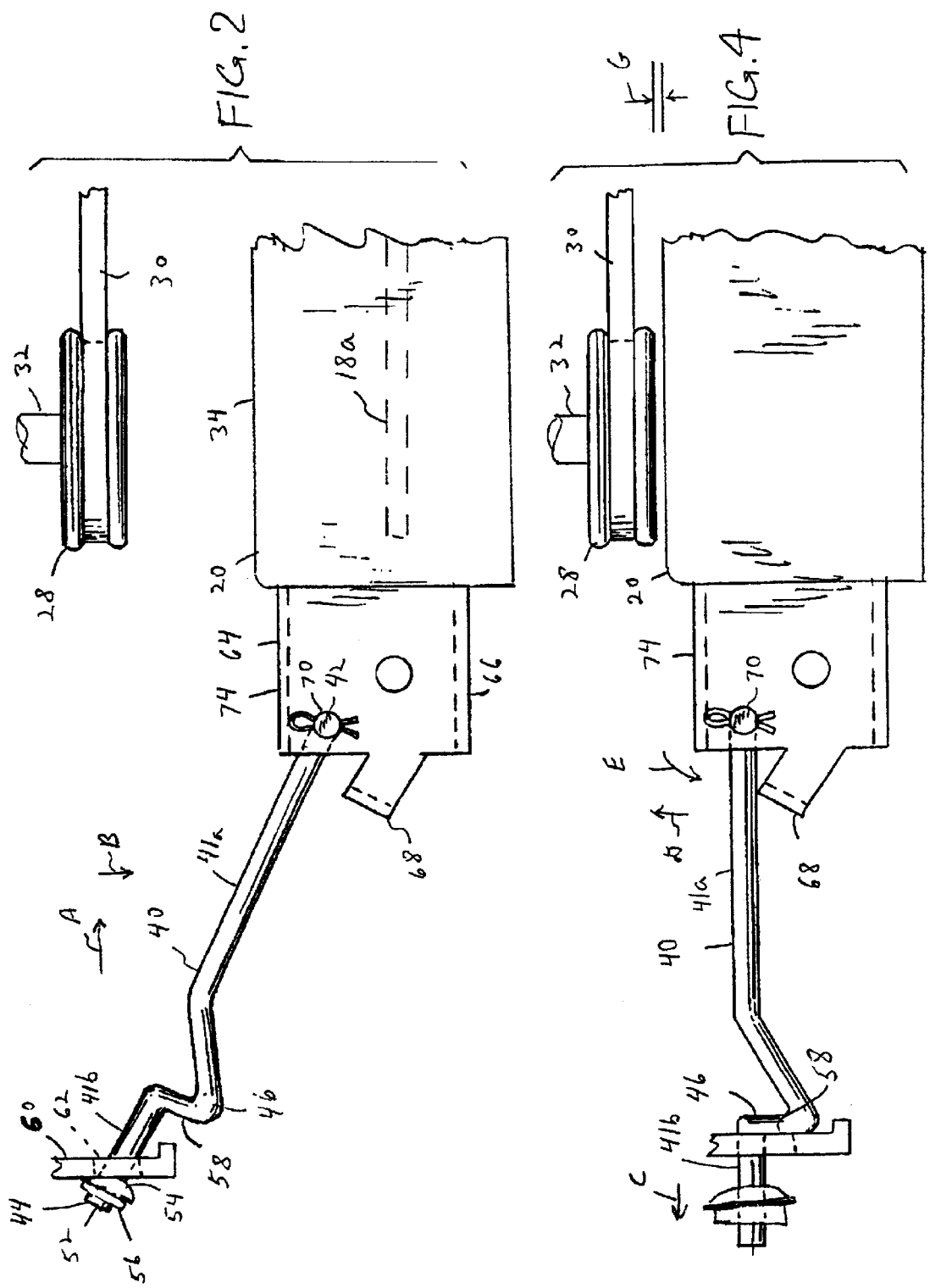

LAWN MOWER DECK VERTICAL MOVEMENT LIMITER

BACKGROUND OF THE INVENTION

1. Field of the Invention

The present invention relates to lawn mowers and, more particularly, to a vertical movement limiter for a deck of a lawn mower.

2. Prior Art

Lawn mowers and garden tractors are generally well known in the art. One form of garden tractor has a vertically movable deck suspended from a frame of the tractor. The deck comprises wheels which can ride along the ground or terrain. Vertical downward movement of the deck relative to the frame is limited by draft rods connected between the deck and axle assemblies of the tractor. Additional parts are added to the frame as a means to limit upward movement of the deck to prevent the deck from contacting the engine pulley. These additional parts increase the cost of the tractor and increase the assembly time of the tractor. There is a desire to provide a system which can limit upward vertical movement of the deck, so the deck does not hit the engine pulley, but without the increased cost of additional parts and without the additional costs associated with assembly of additional parts.

SUMMARY OF THE INVENTION

In accordance with one aspect of the present invention, a lawn mower is provided having a frame, a motor connected to the frame, a driver's seat located on the frame, a cutting blade connected to the motor, a deck located above the cutting blade and vertically movably mounted to the frame, and a draft rod connected between the deck and a portion of the frame. The draft rod is movably connected between the deck and the portion of the frame to limit upward vertical movement of the deck relative to the frame to a predetermined upper stop location.

In accordance with another aspect of the present invention, a lawn mower is provided comprising a frame; a motor connected to the frame; a cutting blade connected to the motor; a deck vertically movably connected to the frame; and a vertical movement limiting bar connected between the deck and a portion of the frame. The deck is located over the cutting blade. The limiting bar is pivotably connected to a mounting section of the deck and longitudinally slidingly connected to the portion of the frame. The mounting section of the deck has a limiter for limiting downward rotation of the limiting bar.

In accordance with another aspect of the present invention, a lawn mower is provided comprising a frame; a motor connected to the frame; a cutting blade connected to the motor; a deck vertically movably connected to the frame, the deck being located over the cutting blade; a vertical movement limiting bar connected between the deck and a portion of the frame. The limiting bar is pivotably connected to a mounting section of the deck and longitudinally slidingly connected through a hole in the portion of the frame. The limiting bar comprises a stop surface located between the deck and the portion of the frame for limiting longitudinal axial movement of the bar through the hole in the portion of the frame.

BRIEF DESCRIPTION OF THE DRAWINGS

The foregoing aspects and other features of the present invention are explained in the following description, taken in connection with the accompanying drawings, wherein:

FIG. 2 is a partial side elevational view of components of the lawnmower shown in FIG. 1 shown at a first position;

FIG. 4 is a partial side elevational view of the components shown in FIG. 2 at a second position.

DETAILED DESCRIPTION OF THE PREFERRED EMBODIMENT

Figure 1:
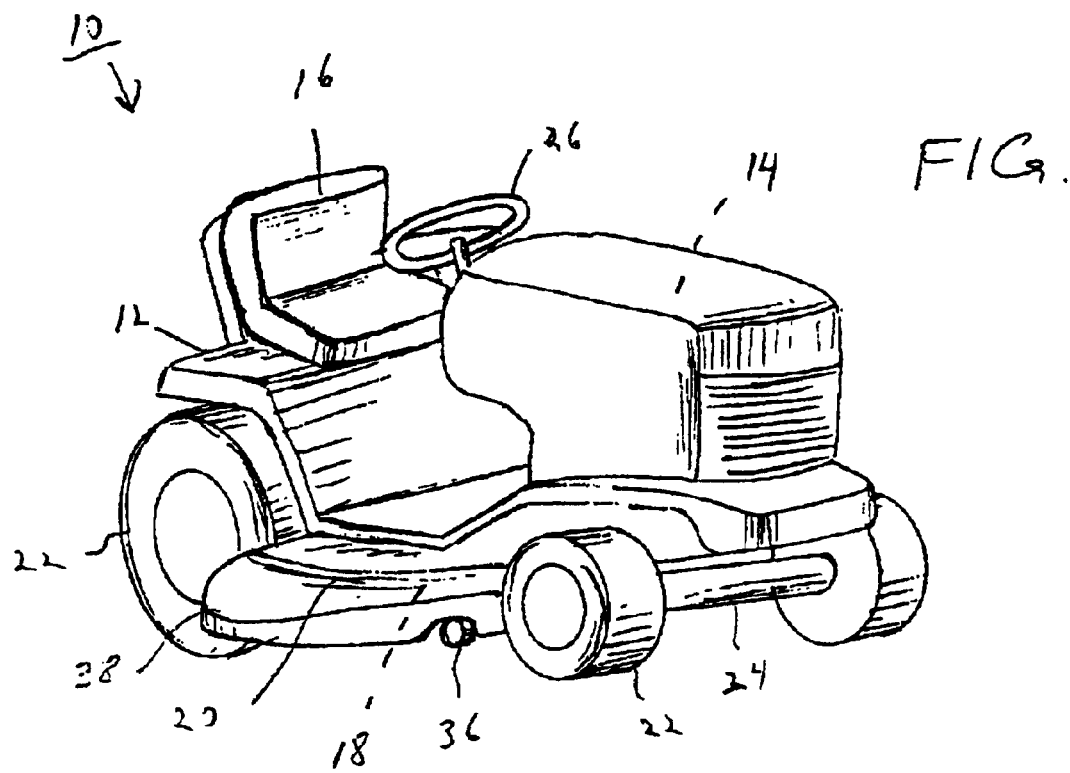
FIG. 1 is a perspective view of a lawn mower incorporating features of the present invention.

Referring to FIG. 1, there is shown a perspective view of a lawn mower or tractor 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The lawn mower 10 generally comprises a frame 12, a motor 14, a driver's seat 16, a cutting blade 18, and a deck 20. The frame 12 is supported on the ground by wheels 22 connected to the frame 12 by axle assemblies 24. The motor 14 is connected to the frame 12 and is operably connected to the wheels 22 by a suitable transmission (not shown). A steering mechanism 26 is also connected to the front wheels 22.

Referring also to FIG. 2, the cutting blade 18 preferably comprises a plurality of cutting blades 18a which are connected to the motor 14 by a suitable transmission which includes a main drive pulley or engine pulley 28 and a transmission belt 30 (see FIG. 2). However, in alternate embodiments, the mower might have only one cutting blade. The main drive pulley 28 is connected to a drive shaft 32 extending downward from the motor 14. The transmission belt 30 is preferably connected to a plurality of pulleys and drive belts (not shown) which, in turn, are connected to shafts (not shown), that extend through the top side 34 of the deck 20, and are connected to individual ones of the cutting blades 18a. However, in alternate embodiments, any suitable type of transmission for connecting the motor 14 to the cutting blades 18 could be provided.

The deck 20 is movably connected to the frame 12. More specifically, the deck 20 is vertically movable relative to the frame 12. The deck 20 has a general cap shape and substantially surrounds the cutting blades 18a except on the bottom side of the deck. A lateral side of the deck 20 also preferably comprises a discharge chute 38. The deck 20 preferably comprises wheels 36. In a preferred embodiment, on flat level ground the wheels 36 would ordinarily not touch the ground. Instead, the deck 20 would be held in suspension above the ground. However, for uneven terrain or relatively high grass, the wheels 36 can touch the ground and the deck 20 can move upward relative to the frame 12.

Figure 3:
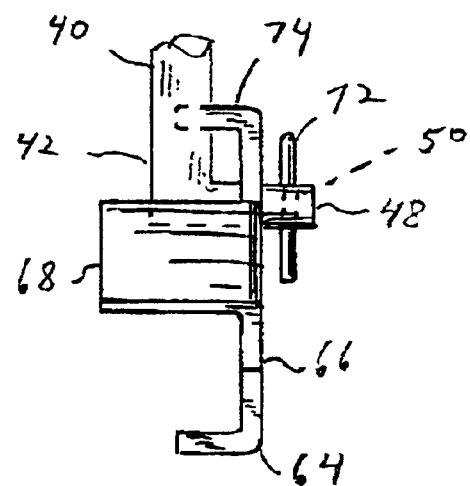
FIG. 3 is front elevational view of the draft rod mounting section and a portion of the draft rod shown in FIG. 2.

In the embodiment shown, the deck 20 is connected to the frame 12 by a plurality of draft rods 40 (only one of which is shown). Each draft rod 40 generally comprises a one-piece bar member having a first end 42, an opposite second end 44, and a section 46 therebetween. The first end 42 is connected to the deck 20. Referring also to FIG. 3, the first end 42 generally comprises a first mounting section 48. The first mounting section 48 comprises a bent section of the first end 42 and a hole 50 extending through the mounting section 48. However, in alternate embodiments, the first end 42 could have any suitable type of size or shape.

The second end 44 comprises a second mounting section 52. In the embodiment shown, the second mounting section 52 generally comprises a threaded section of the second end 44 of the draft rod. In the embodiment shown, the draft rod 40 has an enlarged semi-spherical member 54 and a nut 56 attached to the second end 44. However, in alternate embodiments, any suitable type of enlarged member(s) could be attached to the second end 44 of the draft rod 40.

The section 46 located between the first and second ends 42, 44 is an enlarged section. More specifically, in the embodiment shown, the enlarged section 46 comprises a bent section of the draft rod 40. However, in alternate embodiments, the draft rod 40 could be provided with any suitable type of enlarged section, or member(s) which form an enlarged section. The draft rod 40 comprises first and second sections 41a and 41b located on opposite sides of the enlarged section 46. The first and second sections 41a and 41b are relatively straight sections and are coaxially aligned relative to each other. However, in alternate embodiments, the first and second sections 41a and 41b could have any suitable shapes and orientations relative to each other. In this embodiment, the enlarged section 46 has an end 58 at the second section 41b which has a relatively straight surface generally perpendicular to the second section 41b. This relatively straight surface end 58 functions as a stop limiter as further understood below. However, in alternate embodiments, the end 58 could have any suitable type of size or shape.

In the embodiment shown, the second end 44 of the draft rod 40 is connected to the frame 12 at a member 60 of the axle assembly 24. The member 60 could be comprised of any suitable material, such as a cast metal member or a steel member. The member 60 comprises a hole 62 therethrough. However, in alternate embodiments, the draft rod could be connected to any suitable member(s) The second end 44 of the draft rod 40 extends through the hole 62. The semi-spherical member 54 is larger than the hole 62. Thus, the semi-spherical member 54 prevents the second end 44 of the draft rod 40 from passing completely through the hole 62 in direction A. The semi-spherical member functions as a stop limiter for limiting movement of the draft rod in a first direction A and thereby limit movement of the draft rod 40 in a second downward direction B.

The first end 42 of the draft rod 40 is connected to the deck 20 by a mounting section 64. In the embodiment shown, the mounting section 64 comprises a bracket 66 with an integral tab 68. In a preferred embodiment, the mounting section 64 is comprised of a one-piece member made of metal which is welded or otherwise fixedly attached to the deck 20. Referring also to FIG. 3, the bracket 66 extends forward from the front end of the deck 20. The tab 68 extends forward from the front end of the bracket 66 and then extends in a lateral direction. The bracket 66 comprises a hole 70 therethrough.

The draft rod 40 is aligned with the tab 68, and extends over the top of the tab 68 to a location behind the tab. The first mounting section 48 located at the first end 44 of the draft rod extends through the hole 70. A cotter pin 72 is located in the hole 50. This prevents the first end 42 from inadvertently moving out of the hole 70. Location of the first end 42 in the hole 70 provides a pivotal mounting of the draft rod 40 to the bracket 66. A top tab 74 on the top side of the bracket 66 limits upward rotation of the draft rod 40 relative to the bracket 66 and deck 20 to the position shown in FIG. 2 with the deck 20 at its lower position. The tab 68 is provided to limit downward rotation of the draft rod 40 relative to the bracket 66 and deck 20 to the position shown in FIG. 4; with the deck 20 is at its upper position. Thus, the draft rod 40 is adapted to rotate relative to the bracket 66 and deck 20 between the two positions shown in FIGS. 2 and 4; the tabs 74 and 68 functioning as rotational limits for the draft rod.

Referring particularly to FIGS. 2 and 4, FIG. 2 shows the deck 20 at its lowest position relative to the pulley 28 and member 60. The draft rods 40 allow the deck 20 to be suspended from the frame when the wheels are not riding on the ground. The draft rods also allow the deck 20 to be retained to the frame when the wheels 36 are riding on the ground. The draft rods 40, mounting sections 64, and members 60 combine to function as downward vertical limiters for limiting the downward vertical movement of the deck 20 relative to the frame.

FIG. 4 shows the deck 20 at its highest position relative to the pulley 28 and member 60. This occurs when the ground pushes the deck upward relative to the frame as indicated by arrow D. With the present invention, the draft rods 40, mounting sections 64, and members 60 combine to function as upward vertical limiters for limiting the upward vertical movement of the deck 20 relative to the frame. More specifically, as the deck 20 is pushed upward by uneven ground or high grass, the draft rods 40 rotate at the hole 70 as shown by arrow E. This can result in the section 41a of the draft rod contacting the top of the tab 68. The tab 68 stops the rotation of the rod in direction E to the position shown in FIG. 4.

The draft rods 40 also longitudinally slide inward through the hole 62 in the member 60 as indicated by arrow C. The enlarged section 46 is larger than the hole 62. Therefore, the end 58 contacts the member 60 which stop movement of the draft rod 40 through the hole 62 in direction C. The draft rod 40 contacts the top of the hole 62 which limits upward movement of the second section 41b in the upward direction E. Therefore, the upward movement of the deck 20 is stopped at the predetermined position or upper stop location shown in FIG. 4 with a spacing or gap G between the engine pulley 28 and the top of the deck 20. Thus, the deck 20 is prevented from hitting the engine pulley 28.

The present invention provides an upward direction deck stop limiter feature for the deck 20 without having to add additional components. Unlike the prior art which had to add additional components to prevent the deck from hitting the engine pulley, the present invention uses redesigned existing components to provide this upward direction deck stop limiter feature. More specifically, in the embodiment shown, the draft rod mounting section on the deck has been redesigned to include a downward rotational limiter (i.e., the tab 68) to limit downward rotation of the draft rod relative to the deck in direction E. The embodiment shown also has a redesigned draft rod with an longitudinal movement limiter (i.e., the enlarged section 46) for limiting the longitudinal movement of the draft rod through the hole 62 in the member 60 in direction C. Therefore, with the redesigned draft rod 40 and draft rod mounting section 64 on the deck 20, there is no longer a need for additional components to be attached to the frame for limiting upward vertical movement of the deck. This feature is accomplished by the new redesigned draft rods and redesigned draft rod mounting sections on the deck. The reduction in the number of parts decreases cost associated with the manufacture of those parts, their storage, and their assembly with the lawn mower.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a lawn mower having a frame, a motor connected to the frame, a cutting blade connected to the motor, a deck located above the cutting blade and vertically movably mounted to the frame, a draft rod connected between the deck and a portion of the frame, the improvement comprising:

the draft rod being movably connected to a mounting section of the deck and longitudinally slidingly connected to the portion of the frame to limit upward vertical movement of the deck relative to the frame to a predetermined upper stop location during in-use operation, the mounting section having a limiter for limiting downward rotation of the draft rod, and wherein the portion of the frame comprises an axle assembly of the lawn mower and the draft rod comprises an enlarged section located between the axle assembly and the deck.

2. A lawn mower as in claim 1 wherein the axle assembly comprises a hole and a portion of the draft rod is movably located in the hole.

3. A lawn mower as in claim 2 wherein the portion of the draft rod is longitudinally slidable in the hole.

4. A lawn mower as in claim 2 wherein the enlarged section is larger than the hole in the axle assembly.

5. A lawn mower as in claim 2 wherein the enlarged section comprises a bent portion of the draft rod.

6. A lawn mover as in claim 1 wherein the deck comprises a bracket on an exterior side of the deck and an end of the draft rod is pivotably connected to the bracket.

7. A lawn mower as in claim 6 wherein the bracket comprises a section extending beneath the draft rod which limits downward rotation of the draft rod relative to the deck.

8. A lawn mower comprising:

a frame;

a motor connected to the frame;

a cutting blade connected to the motor;

a deck vertically movably connected to the frame, the deck being located over the cutting blade;

a vertical movement limiting bar connected between the deck and a portion of the frame, the limiting bar being pivotably connected to a mounting section of the deck and longitudinally slidingly connected to the portion of the frame, wherein the mounting section of the deck has a limiter for limiting downward rotation of the limiting bar.

9. A lawn mower as in claim 8 wherein the portion of the frame comprises an axle assembly of the lawnmower.

10. A lawn mower as in claim 9 wherein the axle assembly comprises a hole and a portion of the limiting bar is movably located in the hole.

11. A lawn mower as in claim 10 wherein the portion of the limiting bar is longitudinally slidable in the hole.

12. A lawn mower as in claim 10 wherein the limiting bar comprises an enlarged section located between the axle assembly and the deck.

13. A lawn mower as in claim 12 wherein the enlarged section is larger than the hole in the axle assembly.

14. A lawn mower as in claim 12 wherein the enlarged section comprises a bent portion of the limiting bar.

15. A lawn mower as in claim 8 wherein the mounting section comprises a bracket on an exterior side of the deck and an end of the limiting bar is pivotably connected to the bracket.

16. A lawn mower as in claim 15 wherein the limiter comprises a tab extending laterally from the bracket, the tab being located beneath a portion of the limiting bar which limits downward rotation of the limiting bar relative to the deck.

17. A lawn mower comprising:

a frame;

a motor connected to the frame;

a cutting blade connected to the motor;

a deck vertically movably connected to the frame, the deck being located over the cutting blade;

a vertical movement limiting bar connected between the deck and a portion of the frame, the limiting bar being pivotably connected to a mounting section of the deck and longitudinally slidingly connected through a hole in the portion of the frame, the mounting section having a limiter for limiting downward rotation of the limiting bar; and wherein the limiting bar comprises a stop surface located between the deck and the portion of the frame for limiting longitudinal movement of the bar through the hole in the portion of the frame during in-use operation.

18. A lawn mower as in claim 17 wherein the limiting bar comprises a bent section which forms the stop surface.

19. In a lawn mower having a frame, a motor connected to the frame, a cutting blade connected to the motor, a deck located above the cutting blade and vertically movably mounted to the frame, a draft rod connected between the deck and a portion of the frame, the improvement comprising:

the draft rod comprising an enlarged section and being movably connected between the deck and the portion of the frame to limit upward vertical movement of the deck relative to the frame to a predetermined upper stop location, wherein the deck comprises a bracket on an exterior side of the deck and an end of the draft rod is pivotably connected to the bracket, and the bracket comprises a section extending beneath the draft rod which limits downward rotation of the draft rod relative to the deck.

* * * * *